May 8, 1956
F. A. HARRINGTON ET AL
2,745,094
BLOCK TYPE PANEL INDICATOR LIGHT
Filed April 21, 1953
2 Sheets-Sheet 1
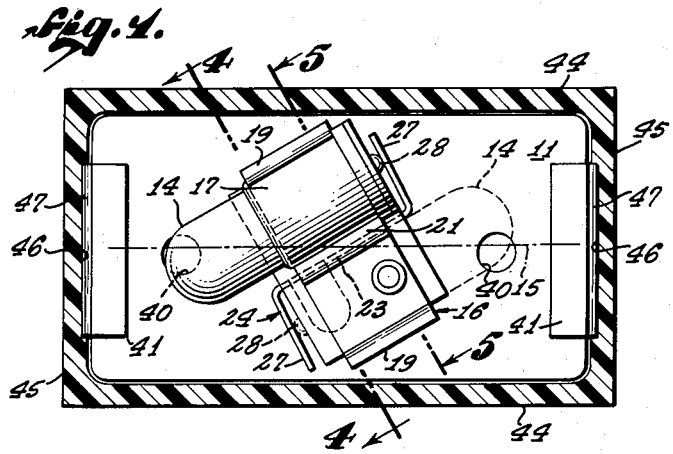
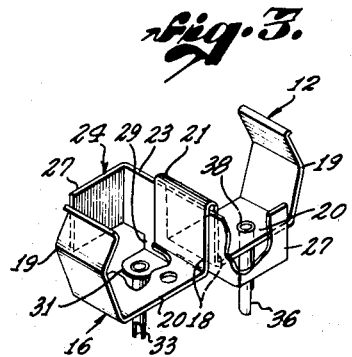
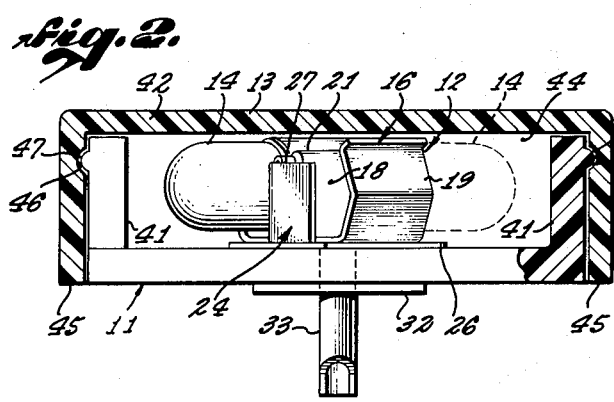
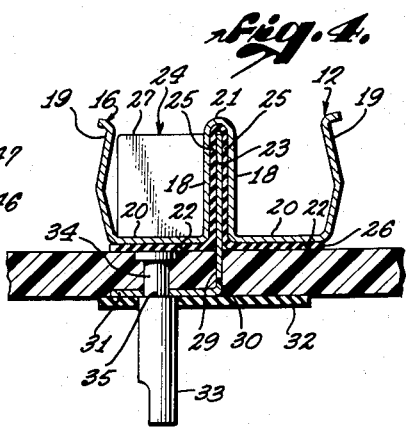
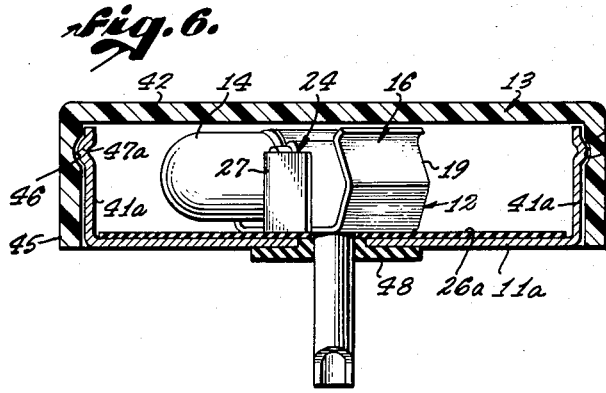
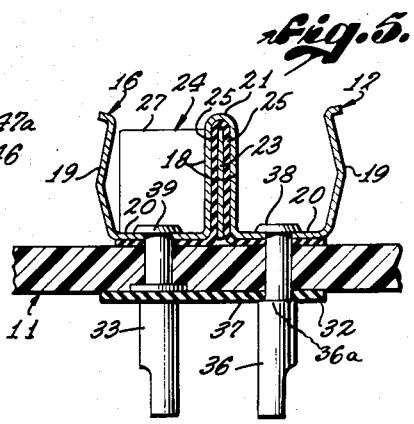
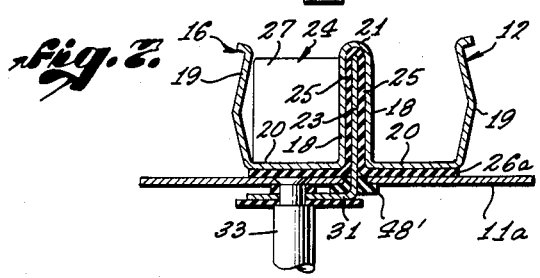
FRANK A. HARRINGTON &
THOMAS W. JENTGES,
INVENTOR.
BY Lynn Latta
ATTORNEY.

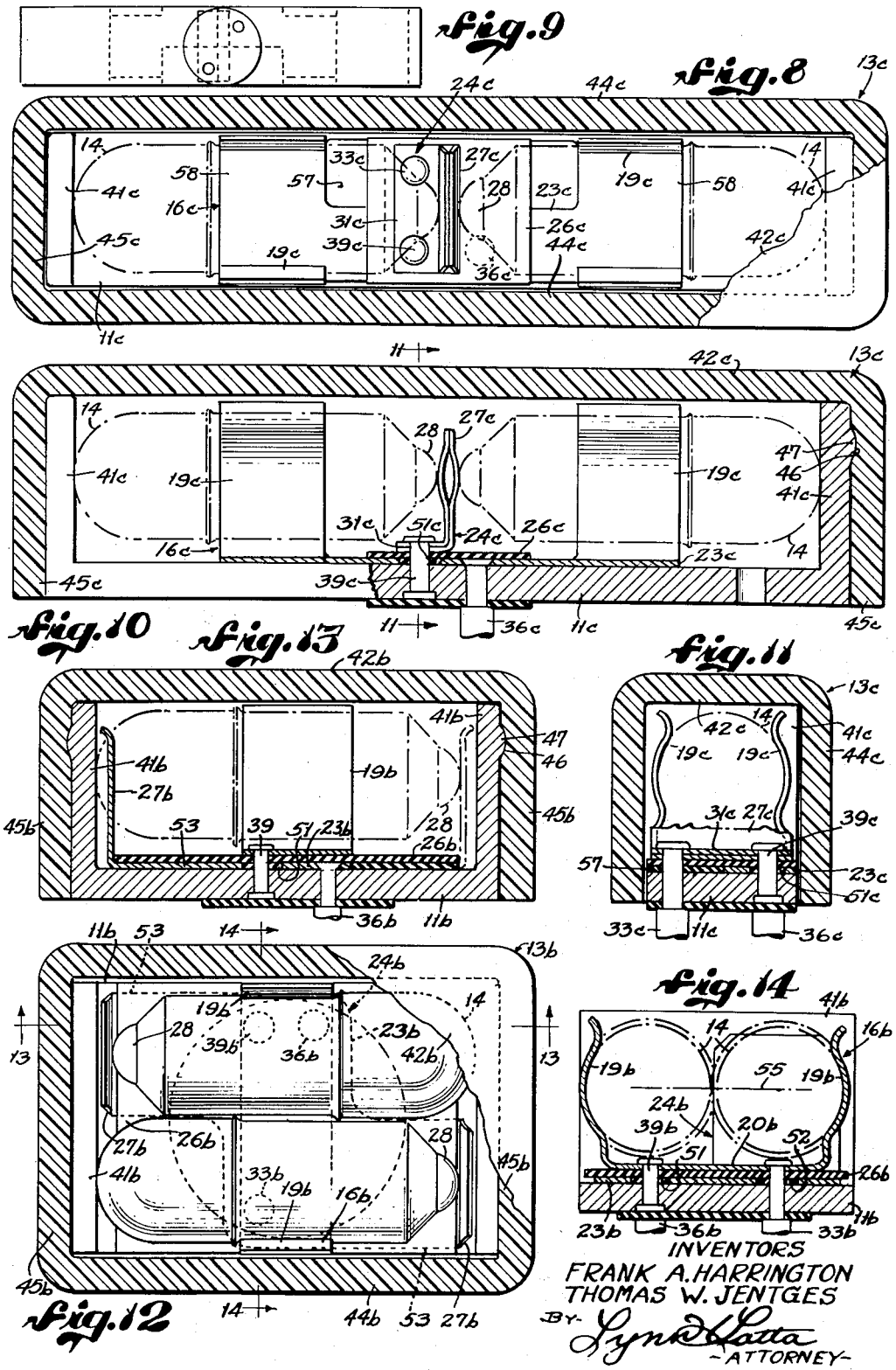

United States Patent Office 2,745,094
Patented May 8, 1956

2,745,094

BLOCK TYPE PANEL INDICATOR LIGHT

Frank A. Harrington, Brea, and Thomas W. Jentges, Santa Ana, Calif., assignors to Marco Industries Company, Anaheim, Calif., a corporation of California Application April 21, 1953, Serial No. 350,116

8 Claims. (Cl. 340—381)

This invention relates to illuminated indicators of the type commonly known as "block indicators," wherein a plurality of small electric lamps are mounted within a casing of hollow block form, the forward wall of the casing being translucent and in some cases carrying indicia for identifying the signal which is indicated by the illumination thereof. Such indicator lamps are commonly used on instrument panels (such as those of aircraft) where a fairly large number of operative units (e. g. servo-units of all kinds) are operated by remote control and require an indication of operating condition.

The conventional block indicator embodies a pair of elongated tubular bulb sockets projecting rearwardly from the hollow casing block which forms the head of the unit. Space must be provided to accommodate these rearwardly projecting bulb sockets. Furthermore, these elongated sockets have appreciable weight, and when a large number of the indicator units are involved, the weight may be such that a substantial reduction therein may be an important consideration.

With the foregoing in mind, the general object of this invention is to provide an indicator lamp of the block indicator type, which is greatly reduced in its space requirements.

A further object is to provide a block indicator which effects a very substantial weight reduction.

A specific object is to eliminate completely the tubular socket elements of the prior block indicators, and to provide an indicator embodying a relatively shallow rectangular casing having the socket or lamp holding terminals entirely enclosed therein.

Other objects will become apparent in the ensuing specification and appended drawings in which:

Fig. 1 is a sectional view of a block indicator embodying the invention, taken in a plane parallel to the front face being removed;

Fig. 2 is a longitudinal sectional view thereof, at right angles to the front face;

Fig. 3 is a perspective view of the terminal socket assembly;

Fig. 4 is a sectional view through the back panel and terminal socket assembly taken on the line 4—4 of Fig. 1;

Fig. 5 is a sectional view taken on the line 5—5 of Fig. 1;

Fig. 6 is a longitudinal sectional view of a block indicator embodying a modified form of the invention;

Fig. 7 is a detail sectional view of the socket unit of Fig. 6;

Fig. 8 is a plan view, partially broken away and in section, disclosing another modified form;

Fig. 9 is a rear plan view of the back panel unit thereof;

Fig. 10 is a longitudinal sectional view;

Fig. 11 is a transverse sectional view of the same taken on the line 11—11 of Fig. 10;

Fig. 12 is a plan view, partially broken away and shown in section, showing a further modification;

Fig. 13 is a longitudinal sectional view thereof; and

Fig. 14 is a transverse sectional view thereof, taken on line 13—13 of Fig. 13.

Referring now to the drawings in detail, our improved block indicator comprises a back panel 11, adapted to be mounted against the forward face of an instrument panel, a terminal socket assembly 12 mounted thereon, and a hollow block casing cap 13 received over the terminal assembly 12 and back panel 11 and cooperating with the latter to enclose the assembly 12 and the lamps (electric light bulbs) 14 mounted therein.

The invention is characterized by the arrangement of indicator lamps 14 within the rectangular space inside casing cap 13 so as to take maximum advantage of this rectangular space and at the same time provide for a relatively simple and satisfactory construction in the terminal socket unit 12. This is accomplished by arranging for the lamps 14 to lie in a common plane parallel to back panel 11, accommodated in the shallow chamber defined between panel 11 and cap 13. The lamps 14 are arranged so that their filaments are each roughly centered below a respective half of the area of the front face of cap 13. In the particular form of the invention, the filaments are centered in respective areas which lie on respective sides of a plane normal to and bisecting the longitudinal axis of the casing. This may be accomplished by arranging the socket unit 12 in a diagonal position in the center of the rectangular space within casing 13, and by having the lamps 14 projecting therefrom in opposite directions so as to occupy the end spaces on the respective sides of the terminal unit 12. The angle of inclination of terminal unit 12 is such that the filaments of lamps 14 are centered substantially along a common longitudinal center line of the casing, midway between the sides thereof, said center line being indicated at 15.

The terminal unit 12 (Figs. 3 and 4) includes a double yoke element, roughly of W-shape, indicated generally at 16, constituting a common ground terminal for the two lamps, and providing a pair of yokes in which the base capsules 17 of the respective lamps are received and held. To this end, ground terminal unit 16 includes a pair of generally U-shaped yokes each having an inner leg 18 and an outer leg 19 joined by a bottom web 20, with the two inner legs 18 joined by a bridging bend 21 at the top of the unit. Outer legs 19 are bent or bowed as shown, so that their inner sides are concave to grip the base capsules 17 and hold them firmly. The inner legs 18 are preferably straight, parallel and laterally spaced so as to embrace a connector bar 23 of a "hot" terminal part 24, with the vertical portions 25 of an insulator strip 26 sandwiched therebetween. Insulator strip 26 includes a central bend which extends around the upper end of bar 23 and within bend 21. It also includes bottom portions 25 which are interposed between webs 20 and back panel 11. Unit 24 is of dihedral Z-shape, including the connector bar 23 and contact arms 27 which project from opposite sides of bar 23 and are positioned at the ends of the respective socket spaces, for engagement by end contacts 28 of the respective lamps 14. The contact arms 27 are disposed at opposite sides of the socket unit 12, so that the lamps 14 may project in opposite direction as previously indicated.

A tab 29 is formed integrally with connector bar 23, projects downwardly through a slot 30 in one side of base panel 11, and terminates in an ear 31 which is sandwiched between the lower face of back panel 11 and an insulator disc 32. A terminal post 33 has a tang 34 extending through disc 32 and anchored in back panel 11, and has a shoulder 35 which bears against ear 31. Preferably, terminal post 33 is soldered or brazed to ear 31.

A second terminal post 36 (Fig. 5) has a shoulder 36a bearing against insulator disc 32, and a tang 37 extending through tang 32, panel 11, one of the insulator parts 26, and a web 20, and is headed at 38 against the web 20 to provide an electrical connection therewith and securely anchor the post in panel 11.

Back panel 11 has apertures 40 therein, for reception of the screws, bolts or rivets used in attaching the unit to an instrument panel or the like, and has, at its respective ends, a pair of parallel arms 41 for supporting casing cap 13. Cap 13 has a front wall 42, in which letters or other indicia may be engraved or molded in some cases; and has side walls 44 and end walls 45, the latter having opposed recesses 46 positioned to receive latching lugs 47 on arms 41. Arms 41 are sufficiently resilient to yield toward one another in order to allow lugs 47 to spring into recesses 46.

Panel 11 and cap 13 may be of molded plastic material, with cap 13 translucent so as to transmit illumination from lamps 14, sufficiently to cause indicia 43 to be made clearly legible.

With base capsules 17 engaged between arms 18, 19, of the respective yoke portions of socket unit 16, and with end contacts 28 engaged against contact arms 27 of contact unit 24, the two lamps are connected in parallel to a current supply circuit communicating with terminal posts 33, 36. The filaments of lamps 14 are substantially centered beneath the respective halves of the area beneath front wall 42, so as to distribute the illumination as uniformly as possible in wall 42.

In the modified form of the invention shown in Figs. 6 and 7, the back panel 11a is of sheet metal and has end arms 41a formed by bending, with lugs 47a formed in arms 41a and engageable in recesses 46. The inner face of panel 11a is covered by an insulating lining 25a, and terminal posts 33 and 36 extend through insulator grommets 48, 48' which fill the holes in panel 11a through which the terminal posts pass.

Fig. 12 shows a modified form of the invention wherein a common ground terminal unit 16b (Fig. 14) comprises a wide yoke adapted to embrace two lamps 14 between its two arms 19b, the latter being bent or bowed outwardly so as to embrace the lamps in a manner to support them. The adjacent sides of the lamps are pressed against each other by the yielding inward spring pressure of arms 19b, as indicated in Fig. 12. Arms 19b are joined by a base web 20b which is secured against an insulating sheet 26b by means of a terminal post 33b and a rivet 39b. The post 33b and rivet 39b are extended through back panel 11b and are headed against the inner face of web 20b to secure the same to the back panel. Terminal unit 16b may be fabricated simply from a length of ribbon or strap metal, with the web 20b being in the form of a narrow strip extending transversely of back panel 11b midway between the ends thereof.

Interposed between insulator sheet 26b and back panel 11b is the base web 23b of the "hot" terminal socket unit 24b. Web 23b is secured in place by a terminal post 33b and a rivet 39b. A small washer 51 of insulating material which is received in an opening in web 23b surrounds rivet 39b so as to insulate web 23b from web 20b. The shank of terminal post 33b is likewise insulated from web 23b by a washer 52 which fills an aperture in web 23b.

A terminal post 36b has a tank which extends through back panel 11b and through web 23b and has a riveted head countersunk in web 23b to establish electrical connection therewith, the head lying below insulator sheet 26b as shown in Fig. 13.

As indicated in dotted lines in Fig. 12, the terminal unit 24b is Z-shaped; including the web portion 20b which extends transversely of back panel 11b; including arm 53 which extend longitudinally of panel 11b in opposite directions from respective ends of web 23b, with one of the arms 53 extending along one side of panel 11b and the other arm 53 extending along the other side of panel 11b; and including contact fingers 27b extending upwardly from the ends of arms 53 for engagement with the end contacts 28 of lamp 14. The central web portion 23b of terminal unit 24b is aligned with the web 20b of terminal unit 16b and lies directly beneath the same, separated therefrom by the insulator sheet 26b.

With the contact fingers 19b disposed at respective sides of the back panel 11b and with the contact fingers 27b disposed at respective ends thereof, it becomes possible to cover the area of back panel 11b almost completely by two lamps 14 disposed side by side as shown in Fig. 12, with the filaments thereof spaced apart along a diagonal line extending between two corners of the panel. Thus the filaments are roughly centered over the two half areas of the panel which are divided by a diagonal line extending between the other two corners thereof, and there is a relatively uniform distribution of light.

Lamps 14 are positioned longitudinally by the engagement of the glass bulbs thereof against end members 41b which are integral with and extend upwardly from the respective ends of back panel 11b, the opposite ends of the lamps being engaged by the yielding spring pressure of contact fingers 27b against contacts 28, whereby the bulbs are pressed against end members 41b. With the outer sides of the respective bulbs cradled in the bowed central portions of contact fingers 19b and receiving yielding pressure therefrom, and with the inner sides of the bulbs directly engaging each other, the bulbs will be supported between the fingers 19b without any possibility of either of them moving in either direction from the plane of the bottoms of the depressions in fingers 19b, said plane being indicated by the line 55. The axes of the lamps 14 will be centered in this plane. Even under the most severe vibration, the bulbs will not be displaced from their centered positions in plane 55.

The casing cap 13b, corresponding to cap 13 except that its sides 44b are shorter, receives the panel 11b and end members 41b and its ends 45b are latched to the end members 41b by the latching dimples 47 and recesses 46. The same reference numerals are used to designate the latching parts.

Because of the greater compactness of arrangements in Figs. 12–14 as contrasted to the other forms of the invention, the unit may be made approximately one third shorter than the unit shown in Figs. 1–7, without substantially increasing its width.

As in the previously described forms of the invention, it will be noted that the terminal units 16b and 24b are arranged in crossed relation, separated by suitable insulation.

In the form of the invention shown in Figs. 8, 9 10 and 11 the casing, including back panel 11c and cap 13c, is long and narrow. This form of the invention is particularly useful where the indicator may require a line of several words, which may be imprinted in the front panel 42c of cap 13c in a manner to be contrast-illuminated when the lamps are lit. Side walls 44c of cap 13c are spaced apart just sufficiently to provide a space slightly wider than the diameter of a lamp 14.

The ground terminal socket unit 16c in this form of the invention embodies an elongated web portion 23c extending longitudinally of and secured to back panel 11c by means of a terminal post 36c and a rivet 39c, the latter being insulated from web 23c by a small washer 51c which surrounds the rivet and is disposed in an opening in web 23c. Web 23c is of considerably less width than panel 11c and is disposed at one side thereof, leaving a space at the other side which is filled by a strip of insulating material 57. Strip 57 is interposed between an insulator sheet 26c and back panel 11c. Formed integrally with and extending upwardly from the respective ends of web 23c, generally parallel to the side edges thereof, are a pair of contact yokes each comprising an opposed pair of contact arms 19c which are integrally joined at their base ends by a base web 58. Webs 58 are formed integrally with, and project laterally from the respective ends of web 23c. Arms 19c are bowed as indicated in Fig. 11 to embrace and support the respective lamps 14 on a common axis which is the median longitudinal axis of the casing.

The end contacts 28 of lamps 14 are arranged adjacent each other and are engaged against the outwardly bowed contact fingers 27c of a "hot" terminal unit 24c. The foot ends of fingers 27c are bent at right angles to provide a terminal unit 24c with a foot portion 31c which is secured against an insulator plate 26c by means of rivets 39c at one end thereof and a terminal post 33c at the opposite end thereof. Post 33c has a shank extending through back panel 11c and through foot portion 31c and headed over the latter.

Lamps 14 bear against end members 41c of back panel 11c, being yieldingly pressed thereagainst by spring pressure in the bowed contact fingers 27c. Yoke fingers 19b likewise are spring pressed against the sides of the lamp bases, and thus the lamps are securely held against vibration.

The ends 45c of cap 42c are latched to end members 41c in the same manner as the previously described forms of the invention, and similar reference characters are used to designate the latching parts.

The total area of the indicator device of Figs. 8–10 is approximately the same as that of Figs. 11–14, although it is of course distributed differently, being long and narrow as contrasted to the short and wide area of Figs. 11–14. Maximum utilization of space within the casing is a characteristic of both forms of the invention. The lamp filaments are arranged near the respective ends of the casing so that satisfactory distribution of light from end to end of the casing is obtained.

In each form of the invention, the translucent plastic material of the casing cap functions as a light distributing medium, the light rays travelling lengthwise of the front panel and being emitted therefrom throughout its entire length and breadth. In each case, the lamps are mounted in a common plane in fairly compact relation, for maximum utilization of minimum space, and the only parts that project rearwardly from the back panel are the contact posts which are adapted to enter the apertures of the conventional mounting panel and need only be long enough to pass through the thickness of the mounting panel and project beyond the rear face thereof just sufficiently to make it possible to conveniently solder conductor wires thereto. The necessity for utilizing space behind the panel to accommodate relatively deep receptacles for the lamp bases of the conventional light unit, is eliminated in the present invention.

Figs. 1–7 of the drawings show the invention with a nine to one (by area) magnification, or on a three to one linear scale. Figs. 8–14 are illustrated on a 5:1 linear scale or a 25:1 magnification of area. The lamps shown are of the miniature type, the overall length of each lamp being not over nineteen thirty-seconds of an inch (19/32") and the diameter being not over one-quarter inch. The overall length of casing cap 13 may be not over one and three eighths of an inch, and of casing cap 13b, about one inch. These figures are given merely to illustrate the miniature proportions which are desirable in a block indicator.

We claim:

1. For a block indicator panel light utilizing a plurality of lamps each having a ground contact base capsule, having a live contact at one end and having a light transmitting bulb at the other end thereof, a multiple socket assembly having a base plane adapted to fit against a flat back panel, comprising: a live terminal unit of dihedral Z-shape including a central web having live contact arms projecting in opposite directions from respective ends thereof, said web ends being disposed in planes at right angles to said base plane; and a ground terminal unit of W-shape, including a central portion in the form of a flat arch embracing and insulated from said central web of the live terminal unit, base web portions extending in opposite direction from said central portion, in said base plane, and ground contact legs extending from the outer ends of such base web portions in generally parallel relation to said flat arched central portion to define therewith a pair of yokes for embracing respective lamp base capsules; said live terminal unit and ground terminal unit and ground terminal unit being in cross relation one to the other.

2. A socket assembly as defined in claim 1; wherein said live terminal unit includes a tab constituting an integral extension of said central web thereof, adapted to project through said back panel, and having an end tab portion bent at right angles to lie against the rear face of said back panel; including a live terminal post extending through said end tab portion and having a shoulder engaging the same; and including a ground terminal post extending through one of said base web portions of the ground terminal unit and secured thereto and adapted to extend through said back panel.

3. For a block indicator panel light of elongated shallow form, utilizing a plurality of lamps each having a ground contact base capsule having a live contact at one end and having a light transmitting bulb at the other end thereof: a multiple socket assembly having a base plane to fit a flat back panel, said socket assembly comprising: a sheet metal ground terminal unit including a web portion for attachment to said back panel and ground contact legs arranged to embrace and to establish common ground contact with the respective base capsules of said lamps and to support said lamps with their respective longitudinal axes lying in a common plane parallel to said back panel, said ground terminal unit being disposed diagonally across the longitudinal median axis of said panel light, with its said legs positioned for maintaining said lamps in side by side parallel relation to one another with their respective major axes diagonally crossing said median axis; and a live terminal unit having live contact arms positioned to engage said live contacts of the respective lamps and to determine positions of said lamps wherein said bulbs project in opposite directions from the center of said panel and wherein each is substantially centered on said median axis and substantially centered with reference to a respective half of the area thereof.

4. A multiple socket assembly as defined in claim 3, wherein said live terminal unit is of dihedral Z-shape, including a central web and having said live contact arms projecting in opposite directions from respective ends thereof, with said web and arms disposed in planes at right angles to said base plane; and wherein said ground terminal unit is in crossed relation to said live terminal unit and is of W-shape, including a central arched portion embracing and arched over said central web, including base web portions extending in opposite directions from said arched portion and arranged to be supported against said back panel, and including legs extending from the outer ends of said base web portions in generally parallel relation to said central arched portion to define therewith a pair of yokes for embracing respective lamp base capsules; and a strip of insulating material interposed between said central web and said central arched portion in interleaved arrangement and insulating one from the other.

5. A multiple socket assembly as defined in claim 4, wherein said live terminal unit includes a tab constituting an integral extension of said central web thereof, to project through said back panel to the rear face thereof, and having an end tab portion bent at right angles to lie against said rear face; including a live terminal post having a shank adapted to be anchored in said back panel and extending through said end tab portion, and a shoulder engaging the same; and including a ground terminal post adapted to extend through said back panel and one of the base web portions of said ground terminal unit and headed thereagainst.

6. A multiple socket assembly as defined in claim 5 wherein said insulator strip is snugly engaged between said central web and the inner walls of said central arched portion, so as to transmit positioning support between said live terminal unit and said ground terminal unit.

7. A casing and socket assembly for a multiple lamp block indicator panel light, utilizing a plurality of lamps each having a ground contact base capsule, a live contact at one end thereof and a light transmitting bulb at the other end thereof, said casing and socket assembly comprising: a multiple socket assembly; a casing comprising a base section of open U-shape, consisting in an elongated back panel and arms projecting forwardly from the respective ends of said back panel and at right angles thereto, and a shallow cap of light transmitting material, including a front display panel to overlie said lamps and to be illuminated thereby, including end walls arranged to embrace said arms of the base section and to interengage therewith so as to secure said cap to said base section, and including side walls cooperating with said end walls to circumscribe an elongated, narrow, shallow space to receive said base section, said socket assembly and said lamps; said multiple socket assembly comprising: a sheet metal ground terminal unit including a web portion for attachment to said back panel and ground contact legs arranged to embrace and to establish common ground contact with the respective base capsules of said lamps and to support said lamps with their respective longitudinal axes lying in a common plane parallel to said back panel, said ground terminal unit being disposed diagonally across the longitudinal median axis of said panel light, with its said legs positioned for maintaining said lamps in side by side parallel relation to one another with their respective major axes diagonally crossing said median axis; and a live terminal unit having live contact arms positioned to engage said live contacts of the respective lamps and to determine positions of said lamps wherein said bulbs project in opposite directions from the center of said panel and wherein each is substantially centered on said median axis and substantially centered with reference to a respective half of the area thereof.

8. A casing and socket assembly for a multiple lamp block indicator panel light, utilizing a plurality of lamps each having a ground contact base capsule, a live contact at one end thereof and a light transmitting bulb at the other end thereof, said casing and socket assembly comprising: a multiple socket assembly; a casing comprising a base section of open U-shape, consisting in an elongated back panel and arms projecting forwardly from the respective ends of said back panel and at right angles thereto, and a shallow cap of light transmitting material, including a front display panel to overlie said lamps and to be illuminated thereby, including end walls arranged to embrace said arms of the base section and to interengage therewith so as to secure said cap to said base section, and including side walls cooperating with said end walls to circumscribe an elongated, narrow, shallow space to receive said base section, said socket assembly and said lamps; said multiple socket assembly comprising a sheet metal ground terminal unit secured to said back panel, said terminal unit having ground contact legs to embrace, and to establish common ground contact with the base capsules of said plurality of lamps and to support the lamps in positions wherein their longitudinal axes lie in a common plane parallel to said back panel; a live terminal unit having live contact arms positioned to engage said live contacts of the respective lamps and to determine positions of said lamps wherein said bulbs project in opposite directions from the center of said panel and wherein each is substantially centered with reference to a respective half of the area thereof.

References Cited in the file of this patent

UNITED STATES PATENTS

| | | |
|---|---|---|
| 690,928 | Clausen | Jan. 14, 1902 |
| 779,779 | Hayward | Jan. 10, 1905 |
| 1,122,100 | Gilsey | Dec. 22, 1914 |
| 1,697,803 | Beringer | Jan. 1, 1929 |
| 1,783,920 | Keeny | Dec. 2, 1930 |
| 2,187,831 | Lange | Jan. 23, 1940 |
| 2,340,053 | Grimes | Jan. 25, 1944 |
| 2,689,945 | Benander | Sept. 21, 1954 |